J. BORDIGION.
FOLDING CAMERA.
APPLICATION FILED MAR. 18, 1919.
1,356,595.
Patented Oct. 26, 1920.
3 SHEETS—SHEET 1.
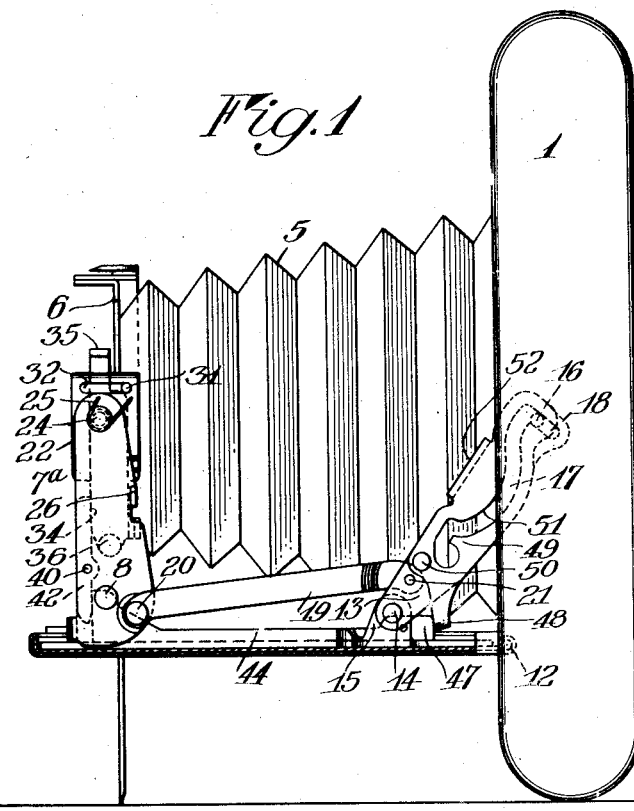
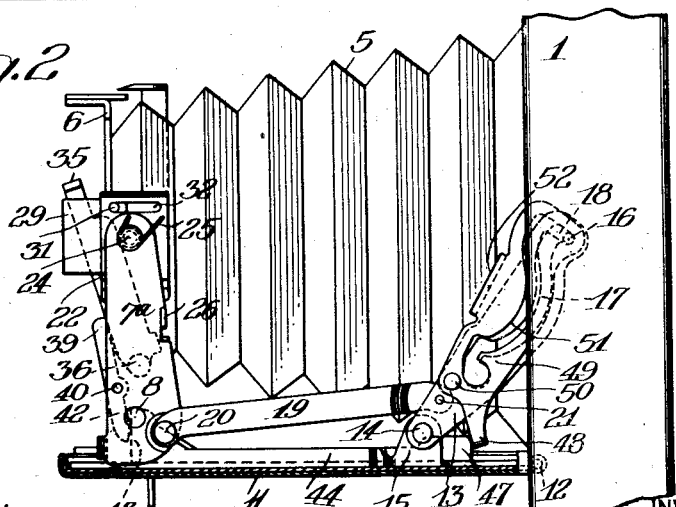
Witnesses:
Nelson H. Opp
INVENTOR
John Bordigion
BY
his ATTORNEYS J. BORDIGION.
FOLDING CAMERA.
APPLICATION FILED MAR. 18, 1919.
1,356,595.
Patented Oct. 26, 1920.
3 SHEETS—SHEET 2.
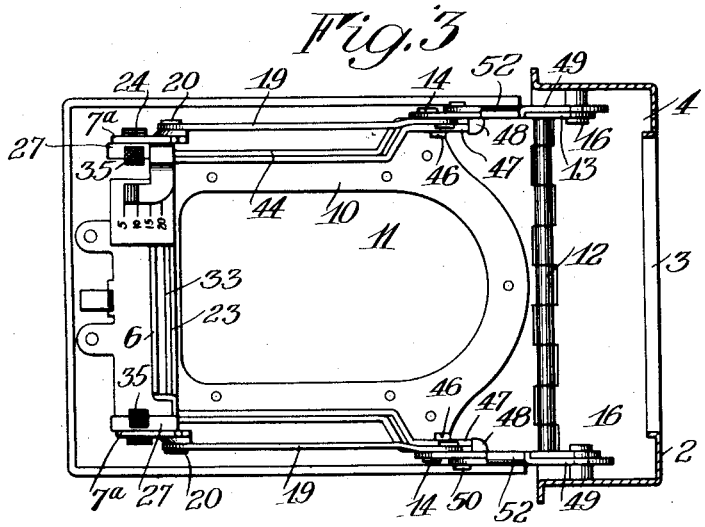
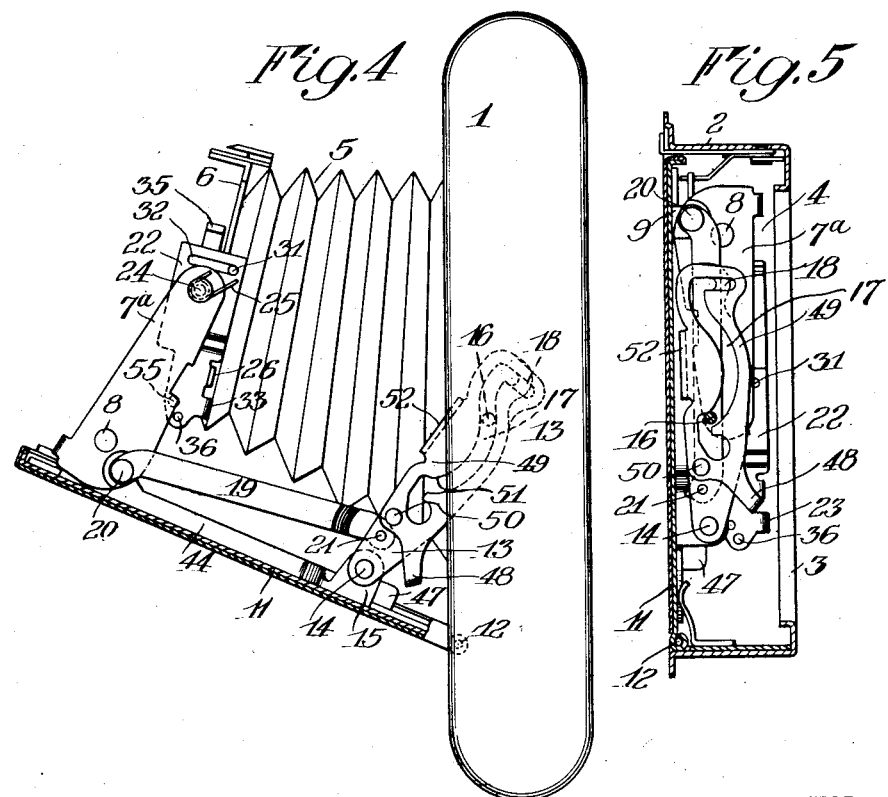
Witnesses:
Nelson H. Copp
Russell B. Griffith
INVENTOR
John Bordigion
BY
his ATTORNEYS

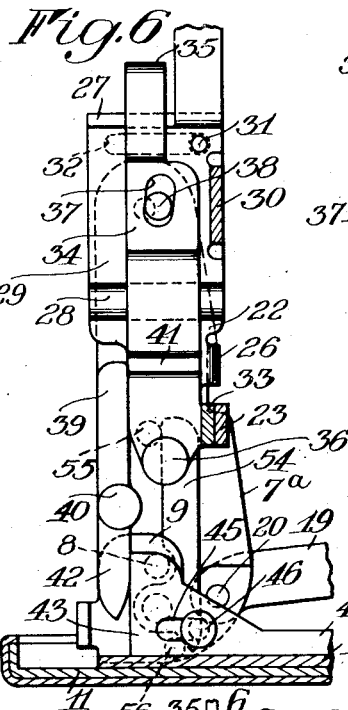

UNITED STATES PATENT OFFICE.

JOHN BORDIGION, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

1,356,595.  Specification of Letters Patent.  Patented Oct. 26, 1920.

Application filed March 18, 1919. Serial No. 283,384.

*To all whom it may concern:*

Be it known that I, JOHN BORDIGION, of Rochester, in the county of Monroe and State of New York, a subject of the King of Italy, have invented certain new and useful Improvements in Folding Cameras; and I do hereby declare the following to be a full, clear, and exact description of the same, reference being had to the accompanying drawings, forming a part of this specification, and to the reference-numerals marked thereon.

My present invention relates to photography and more particularly to folding cameras, and it has for its object to provide a camera of this type with means for automatically bringing the focusing element back to infinity or other predetermined focal position when the camera is folded, so that upon unfolding, it will be initially projected to that position. Further objects of the invention are to provide a simple and efficient mechanism for this purpose and, in its preferred form, the invention contemplates a manual adjustment of the focusing devices that will be unconsciously effected by the operator in his efforts to unlock or release the extended parts of the camera before folding it. To these and other ends the invention resides in certain improvements and combinations of parts, all as will be hereinafter more fully described, the novel features being pointed out in the claims at the end of the specification.

In the drawings:

Figure 1 is a side elevation of a camera constructed in accordance with and illustrating one embodiment of my invention, the bed being shown in longitudinal section and the focusing element being in zero position;

Fig. 2 is a similar view with parts of the body broken away and the focusing element at the limit of its focusing movement;

Fig. 3 is a top plan view of the camera bed in horizontal section through the body, the bellows and other parts being removed;

Fig. 4 is a view similar to Fig. 1 showing the positions of the parts at a point in the folding movement of the camera;

Fig. 5 is a vertical section through the folded camera with all parts of the body removed with the exception of the bellows frame;

Figs. 6, 7 and 8 are enlarged sections through the front and a part of the bed, Figs. 6 and 7 being taken on the line 6—6 of Fig. 9 and respectively showing different positions of the focusing element, and Fig. 8 being taken on the line 8—8 of Fig. 9, and Fig. 9 is an enlarged fragmentary front view of the camera front showing the camera bed in transverse section.

Similar reference numerals throughout the several views indicate the same parts.

I have shown my improvements in the present instance, as applied to a camera having a folding front supported on a hinged bed and automatically erected through the extension of the bed. I will first explain the construction of the front itself and then describe the manner in which the other mechanism is adapted to it.

The camera comprises a body 1 having a bellows frame 2 in its interior (Figs. 3 and 5), which bellows frame provides the exposure opening 3 in the focal plane of the camera and forms the chamber 4 in which the bellows and front and all the mechanism hereinafter described are stored when the camera is folded. The bellows is indicated at 5 in some of the views and is connected at its front end to a lens board 6 having an opening 7 to receive the lens tube, shutter and such devices herein omitted. The lens board 6 is supported by the front which comprises a pair of supporting arms 7ª pivoted at 8 to a pair of ears 9 (Figs. 3 and 9) at the forward end of a flanged plate 10 secured to the bed 11. This bed may be the usual form hinged to the body at 12 and acting as a door, closing the bellows chamber 4 when the camera is folded, as shown in Fig. 5. It is held extended by a pair of locking braces or links 13 which are pivoted at 14 at their lower ends to ears 15 on the plate 10. Fixed studs 16 on the camera body ride in slots 17 in the upper ends of these braces and lock within transverse portions 18 of said slots in the usual manner when the bed is fully extended, so that to release the braces and permit folding of the bed, it is necessary to press down upon the forward or upper edges of the braces and carry the studs 16 out of the slots 18, after which the braces are carried to the position of Fig. 5 with the bed.

During such folding movement, the supporting arms 7ª of the front are caused to fold rearwardly into parallelism with the bed through the medium of links 19 pivoted at 20 to the said arms below their pivots 8 and to the links 13 at 21 above their pivots 14. It is thought this action will be understood without further explanation, through a comparison of Figs. 1, 4 and 5. Conversely, when the camera is extended, the action is reversed and the arms 7ª are elevated to automatically erect the front.

The lens board 6 is indirectly pivotally mounted on the supporting arms 7ª through the medium of a swinging carrier 22 upon which latter it has a direct sliding movement. The carrier 22 is yoke shaped, 23 indicating the connecting portion thereof, and its arms are pivoted between the upper ends of the front supporting arm 7ª at 24. Springs 25 associated with the pivots 24 have a tendency to normally rock the carrier into an erect position parallel with the supporting arms 7ª and with the lens board 6 similarly parallel, as shown in Fig. 1. Laterally turned ears 26 on the carrier coöperate with the arms 7ª to limit this motion. When the camera is folded, pressure of the upper edges of the carrier and of the lens board against the bellows, as indicated in Figs. 4 and 5, reverses the position of these parts between the arms 7ª, so that in the folded position of Fig. 5, the lens board is against the bed but in an erect position.

The arms of this yoke shaped carrier 22 are flanged at 27 and 28 (Fig. 9) to form guides slidably receiving enlarged guiding heads 29 turned forwardly from bracket arms 30 proceeding from the lens board 6 and pins 31 on the heads coöperate with slots 32 in the carrier to limit this sliding movement of the lens board on the carrier which is independent of the pivotal movement of the carrier itself on the arms 7ª. This sliding movement is a fine focusing movement for the lens carried by the board 6 and is executed after the front has been automatically erected in approximately the proper focal position for the lens. The adjustment is made by means of another yoke 33 (Figs. 6 and 7) the arms 34 of which are operating levers having thumb pieces 35 at their upper ends and which yoke is pivoted to the carrier 22 at 36. Slots 37 in the upper ends of the levers 34 receive pins 38 projecting from the inner sides of the sliding guide heads 29 of the lens board, so that forward movements of the arms carry the lens board forwardly from the minimum short focus position of Fig. 6 to the maximum long focus position of Fig. 7.

It is desirable, for obvious reasons, to have the lens returned to the predetermined position of Fig. 6 when the camera is folded in order that it be in such condition when projected for use, the said position giving it a focus at infinity. I provide automatic means for insuring the shifting of the lens board to this rearward position as a preliminary to the operation of closing the camera. To this end, I provide a lever 39 pivoted at 40 on the inner side of each side arm 7ª of the front, as clearly shown in Fig. 6. The upper end of this lever is in a position to move rearwardly against an offset portion 41 of the operating arm 34 for the lens board (see Fig. 9) and to move it from the position of Fig. 7 to that of Fig. 6. The said lever 39 is, in each instance, thus actuated rearwardly through the forward movement of its lower end 42 under the influence of a link or thrust member 43 guided, in the present instance, on a flange 44 of the plate 10 by a slot and pin connection 45—46, at each end. The rear end 47 of the thrust member presents a shoulder in the vicinity of the locking link 13 of the bed that is adapted to be engaged by an inturned finger 48 on an operating lever 49 pivoted to the link at 50 and extending substantially coincidentally therewith, being like the link or brace 13, provided with a slot 51 for the stud 16 on the body. Additionally, each of the said operating levers 49 is provided on its upper edge with a flange 52 overlying the edge of the locking brace so that the latter may be actuated to release the stud 16 from the slot 18 only through the medium of this operating lever for the focusing devices on the front.

The operation is as follows:

If the lens board 6 and its guiding heads 29 are left in the forward position of Fig. 7 and of Fig. 2, the forward tilting of the levers 39 will carry the thrust members 43 rearwardly so that they will, through engagement with the fingers 48, be holding the operating levers 49 in the raised position of Fig. 2 with the flanges 52 thereof advanced above and spaced from the locking braces 13. The operator, in folding the camera, now endeavors to press down upon the braces 13 to unlock them from the studs 16. In so doing, he must first depress the operating levers 49 and then operate the two associated parts jointly. This movement of the operating levers throws the thrust members 43 forwardly, rocking the levers 39 and through them the operating arms 34, with the result that the lens board 6 is moved rearwardly to the infinity or other predetermined position on its guiding heads 29, as shown in Fig. 6. When the camera is extended again, the front and lens board will be in the same position and the operating levers 49 are raised again to the operative position of Fig. 2 only in case the lens board is advanced through the medium of the operating arms 34 which reverse the movements of the levers 39 and thrust rods 43.

In order to insure the proper positioning of the lens board carrier 22 with respect to its forward swing under the influence of the springs 25, I pivot at 53 (Fig. 8) to the ears 9 that carry the supporting arms 7ª, a pair of levers 54 that are adapted to engage in the rear of pins 55 on the lens board carrier 22. When the camera is fully extended, pins 56 on the lower ends of the front supporting arms 7 rotate rearwardly against shoulders 57 on these levers 54 below their pivots so that they assist the springs 25 in holding the carrier with its stops 26 pressing firmly against the arms 7 and also lock it in this position. These levers 54 fold down against the bed when the camera is folded and the springs 25 can be relied upon during the unfolding movement to carry the pins 55 forwardly into position to be engaged by the levers 54 before they can rise into position.

I claim as my invention:

1. In a folding camera, the combination with a body, a front adapted to fold within the body and means for supporting the front in projected position, of a focusing element on the front movable into and out of a predetermined focal position, an operating device for returning it to such position and releasable means for locking the front in projected position, said means being rendered inaccessible by the operating device for independent actuation.

2. In a folding camera, the combination with a body, a front foldable within the body and means for supporting the front in projected position, of a focusing element on the front, means for locking the supporting means in extended position and an operating device for the focusing element adapted to be actuated through the application of releasing pressure to the locking means.

3. In a folding camera, the combination with a body, a front foldable within the body, and means for supporting the front in projected position, of a focusing element on the front, an operating device therefor and means for locking the supporting means in extended position adapted to be released through the medium of the operating device for the focusing element.

4. In a folding camera, the combination with a body, a front foldable within the body and means for supporting the front in projected position, of a mechanism for altering the focus including a lens mount movable on the front and means under the control of said mechanism for locking the supporting means in extended position.

5. In a folding camera, the combination with a body, a front foldable within the body and means for supporting the front in projected position, of a locking link connecting the body and supporting means to maintain the latter in extended position, an element on the front for altering the focus and an operating device for said element arranged to control access to the locking link.

6. In a folding camera, the combination with a body, a front foldable within the body and means for supporting the front in projected position, of a locking link connecting the body and supporting means to maintain the latter in extended position, an element on the front for altering the focus and an operating device for said element operable jointly with the locking link when the latter is released to fold the camera.

7. In a folding camera, the combination with a body, a front foldable within the body and means for supporting the front in projected position, of a mechanism for altering the focus including a lens mount movable on the front, and means under the control of said mechanism for locking the front in projected position.

8. In a folding camera, the combination with a body, a front foldable within the body and a bed for supporting the front in projected position, of an element on the front for altering the focus, a locking brace connecting the bed and body and an operating device for the element associated with said brace.

9. In a folding camera, the combination with a body, a front foldable within the body and a bed for supporting the front in projected position, of a focusing element on the front movable into and out of a predetermined focal position, a locking brace connecting the bed and body, an operating lever associated for joint actuation with said brace, a lever on the front adapted to return the focusing element to such position, and a link on the bed for transmitting motion from the first mentioned lever to the second.

10. In a folding camera, the combination with a body, a front foldable within the body and a bed for supporting the front in projected position, of a focusing element on the front movable into and out of a predetermined focal position, a locking brace connecting the bed and body, an operating lever pivoted to and overlying the brace, a lever on the front adapted to return the focusing element to such position, and a thrust member guided on the bed for transmitting motion from the first mentioned lever to the second.

11. In a folding camera, the combination with a body, a bed hinged thereto, locking braces pivoted to the bed and having sliding engagement with the body, a front pivoted to the bed to fold against the same, a lens mount on the front having a rectilinear focusing movement relatively thereto, a link connecting the braces and front to automatically erect the latter when the bed is extended, a lever on the front coöperating with the lens mount when the front is erected and adapted to move said mount to a predetermined position, operating levers associated for joint actuation with the braces and links on the bed for transmitting motion from the operating levers to the said levers on the front.

JOHN BORDIGION.